United States Patent [19]
Hirai et al.

[11] Patent Number: 5,506,895
[45] Date of Patent: Apr. 9, 1996

[54] TELEPHONE APPARATUS WITH AUTOMATIC DIALING FUNCTION

[75] Inventors: Yuji Hirai, Fukuoka; Hiroatsu Ueno, Chikushino, both of Japan

[73] Assignee: Matsushita Electric Industrial Co., Ltd., Osaka, Japan

[21] Appl. No.: 453,352

[22] Filed: May 30, 1995

Related U.S. Application Data

[63] Continuation of Ser. No. 213,830, Mar. 14, 1994, which is a continuation of Ser. No. 856,587, Mar. 20, 1992.

[30] Foreign Application Priority Data

Mar. 26, 1991 [JP] Japan ................................. 3-061887
Apr. 30, 1991 [JP] Japan ................................. 3-098785

[51] Int. Cl.⁶ .................................................. H04M 1/56
[52] U.S. Cl. ........................ 379/142; 379/396; 379/130
[58] Field of Search .................................. 379/142, 387, 379/396, 164, 142, 127, 130

[56] References Cited

U.S. PATENT DOCUMENTS

| | | | |
|---|---|---|---|
| 4,296,282 | 10/1981 | O'Neill et al. | 379/142 X |
| 4,894,861 | 1/1990 | Fujioka | 379/142 X |
| 4,924,496 | 5/1990 | Figa et al. | 379/142 |
| 4,926,471 | 5/1990 | Ikeda | 379/142 X |

Primary Examiner—Creighton Smith
Attorney, Agent, or Firm—Pollock, Vande Sande & Priddy

[57] ABSTRACT

A telephone apparatus, comprises: a memory for storing a telephone number; a switch for producing a switch signal in response to user operation; a dialing circuit for dialing in response a dialing control signal; a control portion responsive to the switch signal for reading out the stored telephone number and producing the dialing control signal in accordance with the stored telephone number; a telephone number detection circuit for detecting a telephone number data indicative of a telephone number of a caller sent from a telephone line; a comparing portion for comparing the detected telephone number data with the stored one to produce a indication signal when the detected telephone number agrees with the stored one; and indication portion responsive to the indication control signal for indicating that the detected telephone number agrees with the stored one. When the caller whose telephone number is registered in this apparatus for automatic dialing, the indication portion indicates the caller's telephone number detected agrees with the registered one. N operational switches, N LEDs, and N nameplates may be correspondingly provided for indicating which person of registered persons in this apparatus is calling or has called.

19 Claims, 5 Drawing Sheets

TELEPHONE APPARATUS WITH AUTOMATIC DIALING FUNCTION

This application is a continuation of Ser. No. 08/213,830, filed on Mar. 14, 1994,which application is a continuation of Ser. No. 07/856,587 filed on Mar. 20, 1992.

BACKGROUND OF THE INVENTION

The present invention relates to a telephone apparatus with automatic dialing function for providing information relating to caller's telephone number sent from a telephone line.

DESCRIPTION OF THE PRIOR ART

A telephone apparatus is known which has a display for indicating a caller's telephone number sent together with a ring signal. In this prior art telephone apparatus, the user can know who are calling before picking up a hand set of the telephone apparatus. Therefore, this function, that is the caller's telephone number indication function, prevents the user from wasting time or labour due to an unnecessary person's call and prevents a mischievous call.

However, in the prior art telephone apparatus, there is a problem that before picking up the hand set, the user should judge whether the caller is an interested person or not according to indication on the display. That is, the user is required an effort that the user remember all telephone numbers of the interested persons for comparison of the indicated telephone number with remembered telephone numbers. In addition, some interval is necessary to judge whether the caller is an interested person or not through this comparison.

On the other hand, another telephone apparatus with automatic dialing function is known which has an automatically dialing function. In such telephone apparatus, the user stores telephone numbers of necessary persons in its memory. When the user calls one of the necessary persons, the user depresses a one-push-motion button or uses a shortening operation button.

However, in a prior art telephone apparatus having the automatic dialing function in addition to the caller's telephone number indication function mentioned above, there is a problem that the user cannot know at a glance of the indication whether the caller is or not one of the interested persons whose telephone number is stored in the telephone apparatus.

SUMMARY OF THE INVENTION

The present invention has been developed in order to remove the above-described drawbacks inherent to the conventional telephone apparatus with automatic dialing function.

According to the present invention there is provided a telephone apparatus with an automatic dialing function, comprising: a storing portion for storing a telephone number; an operational key switch for producing a key switch signal in response to operation of a user; a dialing portion for dialing in response to a dialing control signal; a control portion responsive to the key switch signal for reading out the stored telephone number and producing the dialing control signal in accordance with the stored telephone number; a telephone number detection portion for detecting a telephone number data indicative of a telephone number of a caller sent from a telephone line; a comparing portion for comparing the detected telephone number data with the stored telephone number to produce a indication control signal when the detected telephone number agrees with the stored telephone number; and an indication portion responsive to the indication control signal for indicating that the detected telephone number agrees with the stored telephone number.

According to the present invention there is also provided a telephone apparatus with an automatic dialing function, comprising: N operational key switches for producing N key switch signals in response to operation of a user, the N being a natural number; a storing portion for storing N telephone numbers such that each of the N telephone numbers corresponds to each of the N operational key switches; a dialing portion for dialing in response to a dialing control signal; a first control portion responsive to one of the N key switch signals for reading out one of the N stored telephone numbers which corresponds to the one of the N key switch and for producing the dialing control signal in accordance with the read out telephone number; a telephone number detection portion for detecting a telephone number data indicative of a telephone number of a caller sent from a telephone line; a second control portion for comparing the detected telephone number data with the N stored telephone numbers successively and for producing an indication control signal indicative of information corresponding to one of the N telephone numbers which agrees with the detected telephone number when the detected telephone number agrees with the one of the N telephone numbers; and an indication portion responsive to the indication control signal for indicating the information.

According to the present invention there is further provided a telephone apparatus with an automatic dialing function, comprising: an automatic dialing portion having N operational key switches and N indicators, the N operational key switches responsive to the operation of a user for producing N key switch signals respectively, the N indicators being provided such that each of the N operational key switches corresponds to each of the N indicators, the N being a natural number; a storing portion for storing N telephone numbers such that each of the N telephone numbers corresponds to each of the N operational key switches; a dialing portion for dialing in response to a dialing control signal; a first control portion responsive to one of the N key switch signals for reading out one of the N stored telephone numbers which corresponds to the one of the N key switches operated by the user and for producing the dialing control signal in accordance with the read out telephone number; a telephone number detection portion for detecting telephone number data indicative of a telephone number of a caller sent from a telephone line; and a second control portion for comparing the detected telephone number data with the N stored telephone numbers successively; for detecting which operational key switch of the N operational key switches corresponds to one of the N stored telephone numbers which agrees with the detected telephone number when the one of the N stored telephone numbers agrees with the detected telephone number; and for producing an indication control signal to cause the one of N indicators which corresponds to the detected one of the N operational key switches to effect indication.

According to the present invention there is also provided a telephone apparatus with an automatic dialing function, comprising: an automatic dialing portion having N operational key switches and N indicators, the N operational key switches responsive to operation of a user for producing N key switch signals respectively, the N indicators being provided such that each of the N operational key switches corresponds to each of the N indictors, the N being a natural number; a storing portion for storing N telephone numbers such that each of the N telephone numbers corresponds to each of the N operational key switches; a dialing portion for dialing in response to a dialing control signal; a first control portion responsive to one of the N key switch signals for reading out one of the N stored telephone numbers which corresponds to the one of the N key switches operated by the user and for producing the dialing control signal in accordance with the read out telephone number; a ring signal detection portion for detecting a ring signal to produce a detected ring signal; a detection portion responsive to the detected ring signal for detecting the absence of the detected ring signal for a given interval; a telephone number detection portion for detecting a telephone number data indicative of a telephone number of a caller sent from a telephone line; and a second control portion for comparing the detected telephone number data with the N stored telephone numbers successively; for detecting which operational key switch of the N operational key switches corresponds to one of the N stored telephone numbers which agrees with the detected telephone number when the one of the N stored telephone numbers agrees with the detected telephone number; and for producing an indication control signal to cause the one of N indicators which corresponds to the detected one of the N operational key switches to effect indication in response to the detection portion when the detection means detects the absence of the detected ring signal for the given interval.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 1:
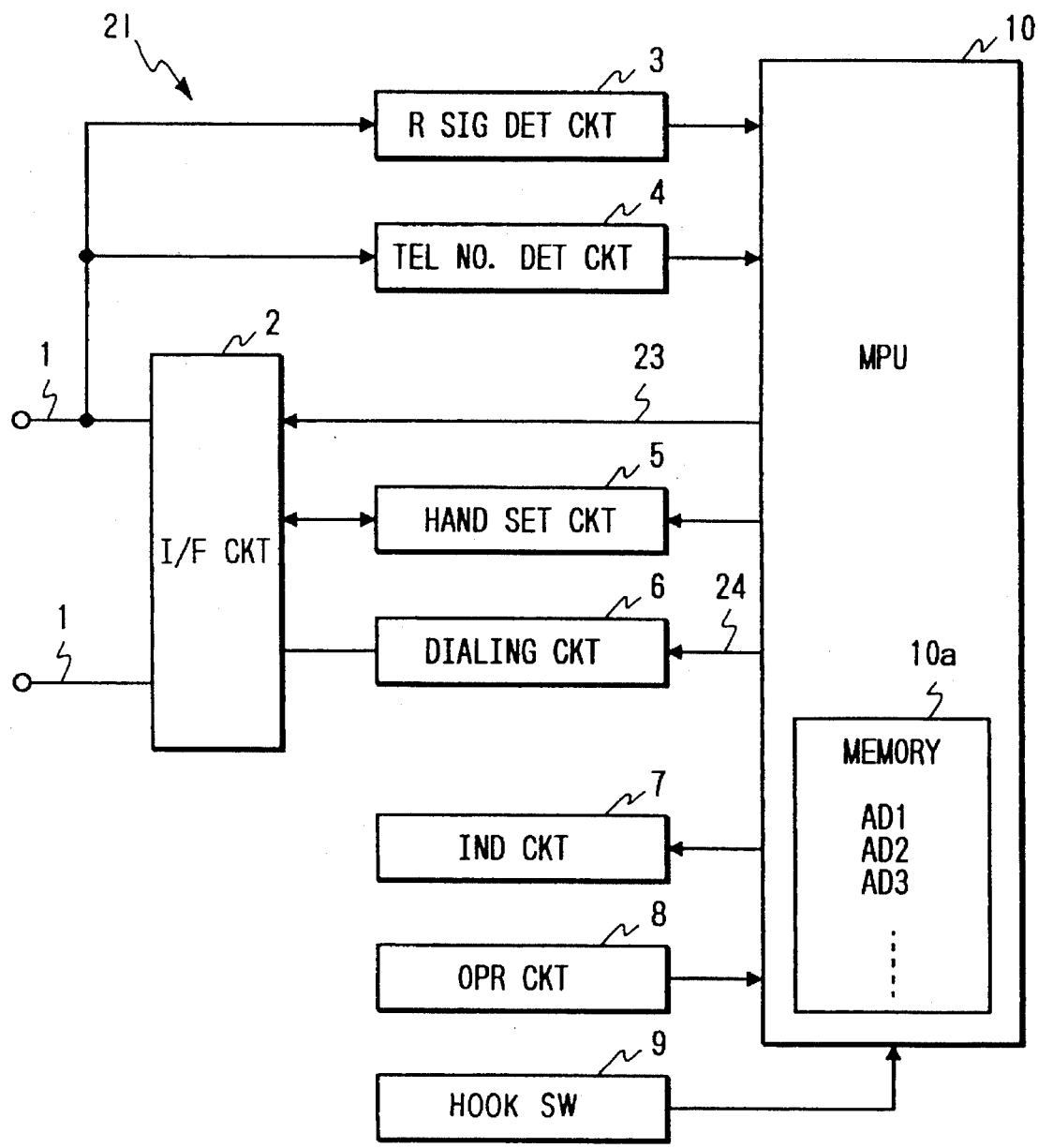
FIG. 1 is a block diagram of the first embodiment of a telephone apparatus of this invention.
Figure 3:
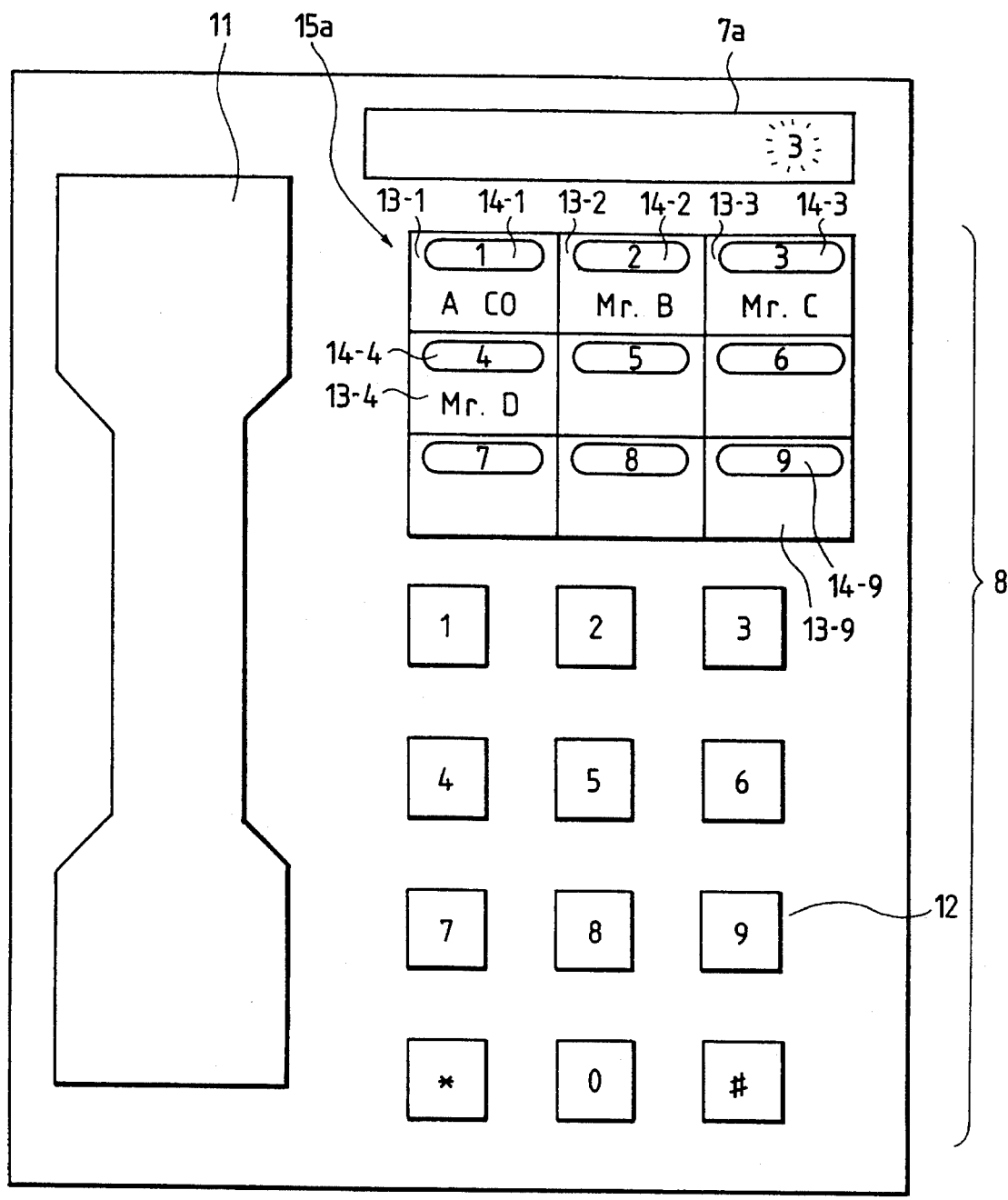
FIG. 3 is an exterior view of the first embodiment of the telephone apparatus.

Hereinbelow will be described a first embodiment of this invention. FIG. 1 is a block diagram of the first embodiment of a telephone apparatus of this invention. FIG. 3 is an exterior view of the first embodiment of the telephone apparatus.

In FIGS. 1 and 3, the telephone apparatus 11 of this embodiment is connected to telephone line 1. A ring signal detection circuit 3 connected to the telephone line 1 detects a ring signal to produce and send a ring signal detection signal to a microprocessor 10 (MPU). A telephone number detection circuit 4 connected to the telephone line 1 detects telephone number data sent from an exchange together with the ring signal to produce and send a detected telephone number data to the microprocessor 10. The telephone line 1 is also connected to a well-known interface circuit 2. The interface circuit 2 performs communication with the telephone line 1 in response to a communication control signal 23 from the microprocessor 10.

A hand set circuit 5 including a hand set 11 sends a sound signal to the telephone line 1 via the interface circuit 2 and receives another sound signal from the telephone line 1 via the interface circuit 2. A dialing circuit 6 sends a dialing signal to the interface 2 in response to a dialing control signal 24 including telephone number data from the microprocessor 10. An induction circuit 7 indicates a caller's telephone number sent from the exchange and indicates that the sent telephone number is one registered for automatic dialing by a predetermined number or a predetermined character on a indicator 7a.

An operation circuit 8 comprises a set of twelve-key 12 for normal dialing and for registering telephone numbers for automatic dialing and automatic dialing keys 14-1 to 14-9 for sending key switch signals for automatic dialing to the microprocessor 10. A hook switch 9 sends an off-hook signal indicative of off/on hook of the hand set 11.

The microprocessor 10 includes a memory 10a therein. The memory 10a stores at least a telephone number for automatic dialing.

In FIG. 3, the hand set 11 reproduces a sound signal from the telephone line 1 and receives a sound signal sent to the telephone line 1 together with the hand set circuit 5. A set of the twelve-keys 12 is used for general dialing. An automatic dialing portion 15a has a set of nameplates 13-1 to 13-9, each indicating a name of which a person is called by the user using the automatic dialing function in correspondence with each of automatic dialing key switches 14-1 to 14-9. The indicator 7a indicates a detected telephone number or a reference code indicating that a person whose telephone number is registered in this telephone apparatus 11 calls the user.

Hereinbelow will be described operation of this embodiment.

The user registers at least a telephone number for automatic dialing by operation of the operating circuit 8. The inputted telephone number is stored in the memory 10a. Therefore, the memory 10a comprises a RAM. However, it may comprise a ROM where telephone numbers are registered in advance.

Figure 2:
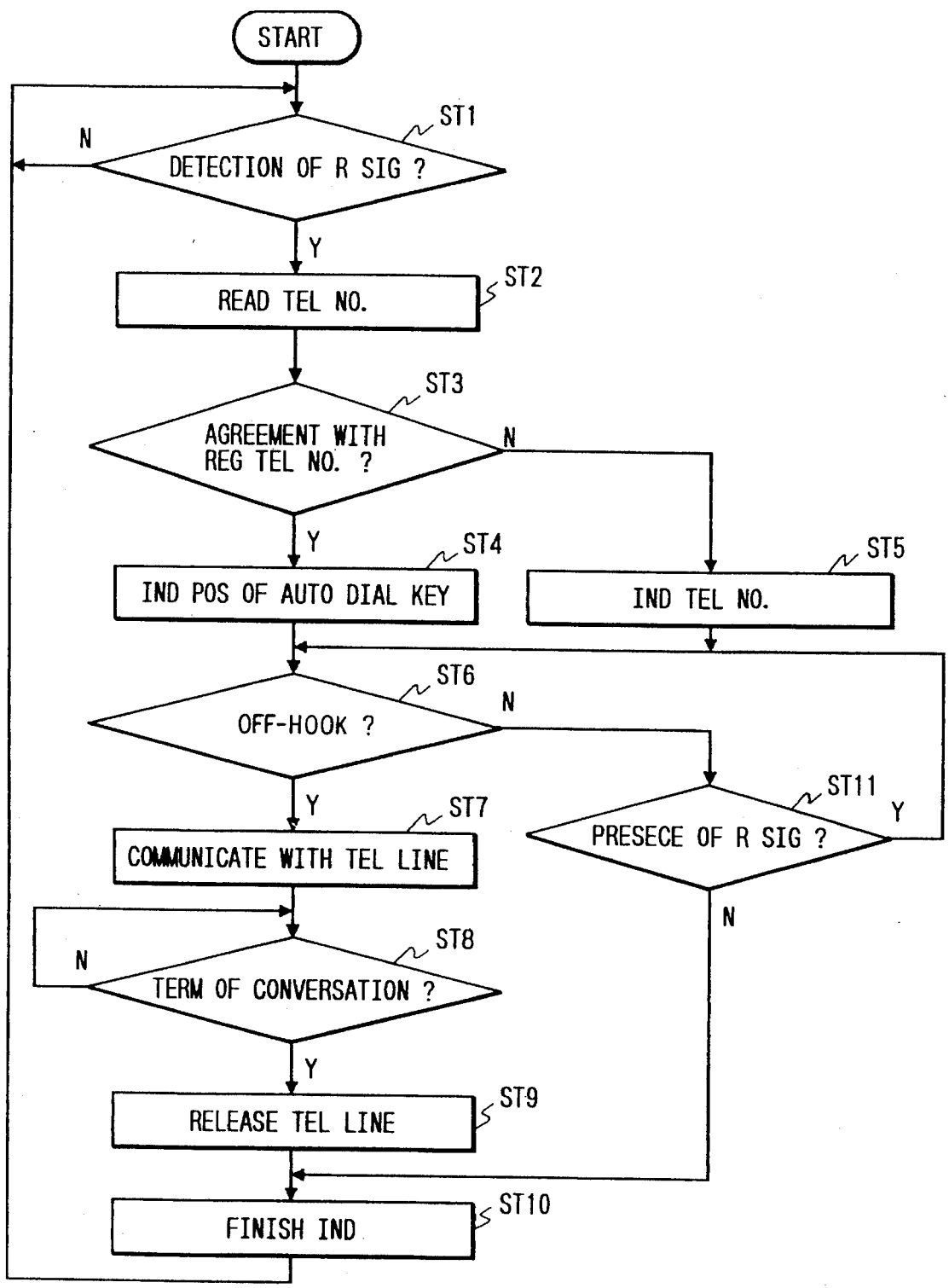
FIG. 2 shows a flow chart of the first embodiment.

The microprocessor 10 executes a stored program whose operation is represented by a flow chart shown in FIG. 2. In FIG. 2, processing starts at a step ST1. In the step ST1, the microprocessor 10 makes a decision as to whether or not the detected ring signal detected by the ring signal detection circuit 3 is present. If the detected ring signal is present, processing proceeds to the following step ST2. If the answer is NO, processing loops until the microprocessor 10 detects the detected ring signal. In the step ST2, the microprocessor 10 reads the detected telephone number data from the telephone number data detection circuit 4. The telephone number data is sent from the exchange. In the following step ST3, the microprocessor 10 compares the detected telephone number with all telephone numbers stored in the memory 10 successively. If the detected telephone number data agrees with one of telephone numbers stored in the memory 10a, the microprocessor 10 sends, to the indication circuit 7, a number or a character so predetermined that it indicates which automatic dialing key of automatic dialing keys 14-1 to 14-9 the detected telephone number corresponds to in a step ST4. If there is no agreement of the detected telephone number data with the registered telephone numbers, the microprocessor 10 indicates the detected telephone number data on the indicator 7a in a step ST5. In the step ST4, the microprocessor sends a number or a character indicating which automatic dialing key of automatic dialing keys 14-1 to 14-9 the detected telephone number corresponds to. However, the microprocessor 10 may send, to the indication circuit 7, an indication signal indicating only that there is agreement of the detected telephone number with registered telephone numbers.

After processing of the steps ST4 and ST5, the microprocessor 10 detects the off-hook signal sent from the hook switch 9 in a step ST6. If the microprocessor 10 detects the off-hook signal, processing proceeds to a step ST7. In the step ST7, the microprocessor 10 causes the interface circuit 2 and the hand set circuit 5 to communicate with the telephone line 1.

In the following step ST8, a decision is made as to whether the off-hook signal indicates the on-hook condition or not. If the off-hook signal indicates the on-hook condition, that is the hook switch 9 is depressed after the termination of communication, the microprocessor 10 causes interface circuit 2 to release the telephone line 1 in a step ST9. In the following step ST10, the microprocessor 10 causes the indication circuit 7 to finish indication of the detected telephone number or character.

According to the operation mentioned above, for example, as shown in FIG. 3, if a number "3" is indicated on the indicator 7a, the user can know the call is from Mr. C denoted on the nameplate 13-3 at a glance by indication on the indicator 7a because the number "3" means that the telephone number for automatic dialing stored in the address AD3 of the memory 10a agrees with the detected telephone number data.

In the step ST6, if the off hook signal indicates on-hook condition, in a step ST11, the microprocessor 10 makes a decision as to whether the ring signal is detected continuously. If the ring signal is not detected continuously, processing proceeds to a step ST10. In the step ST10, the microprocessor 10 causes the indication circuit to terminate the indication.

After termination of the processing of the step ST10, the microprocessor 10 waits the ring signal in the step ST1.

In the first embodiment of the telephone apparatus, the user can know which person whose telephone number is registered is calling. In addition, the user can call back using the automatic dialing key 14c, for example, using the indication on the indicator 7a. This prevents the user to dial manually even if the telephone apparatus has the automatic dialing function and the user does not know the caller is one whose telephone number is registered.

Hereinbelow will be described a second embodiment of this invention.

Figure 4:
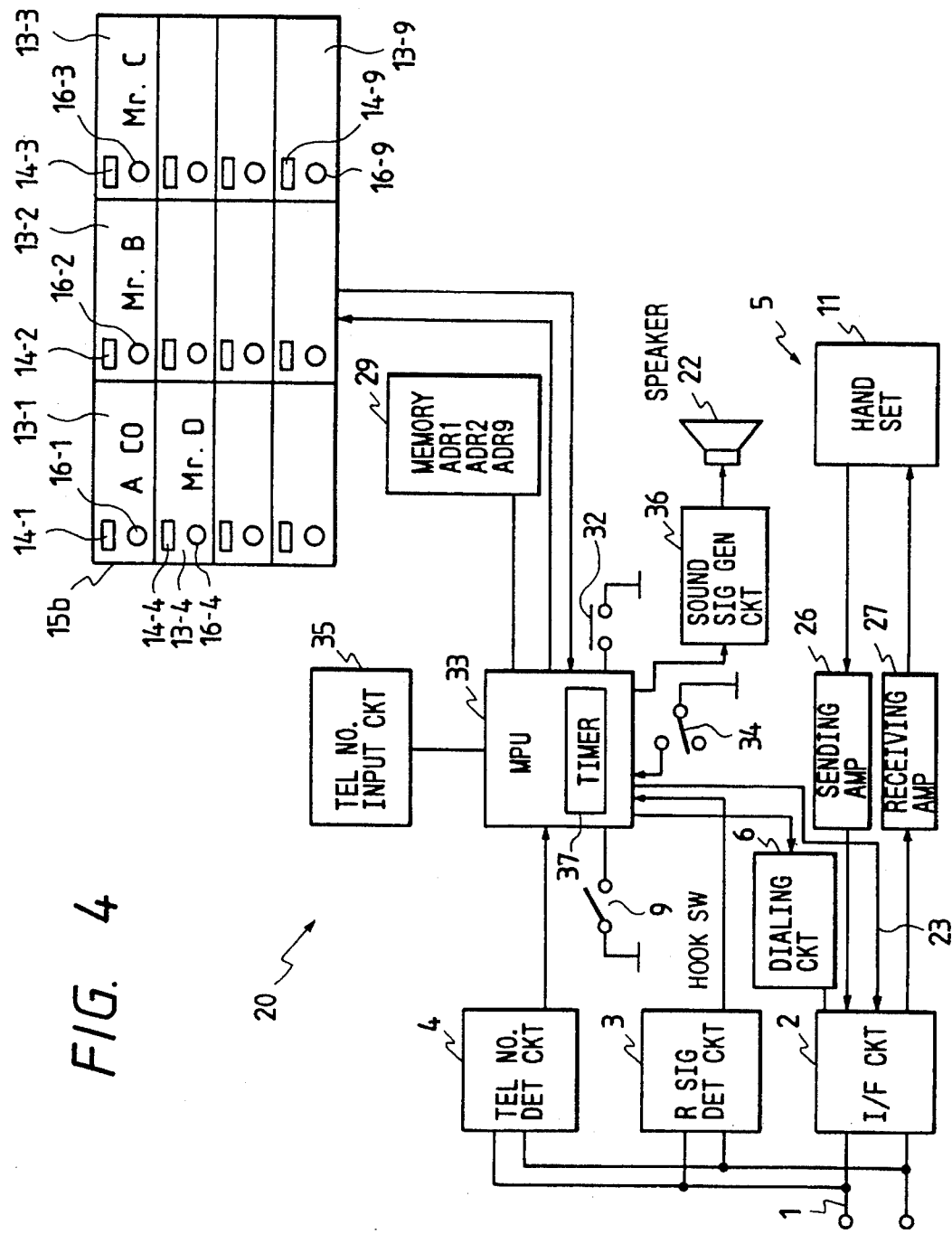
FIG. 4 is a block diagram of a second embodiment of the telephone apparatus.

FIG. 4 is a block diagram of the second embodiment of the telephone apparatus. The automatic dialing portion 15b has a set of nameplates 13-1 to 13-9, each indicating a name of a person whose telephone number has registered, and automatic dialing key switches 14-1 to 14-9, each of the automatic dialing key switches 14-1 to 14-9 being provided adjacent to each of the nameplates 13-1 to 13-9 correspondingly, and LEDs 16-1 to 16-9 as indication means, each being provided adjacent to each of automatic dialing key switches 14-1 to 14-9. Each of automatic dialing key switches sends a key switch signal to the microprocessor 10. The microprocessor 10 control indication of each of LEDs 16-1 to 16-9.

In FIG. 4, the telephone apparatus 20 of this embodiment is connected to telephone line 1. A ring signal detection circuit 3 connected to the telephone line 1 detects a ring signal to produce and send a ring signal detection signal to a microprocessor 33 (MPU). A telephone number detection circuit 4 connected to the telephone line detects telephone number data sent from an exchange together with the ring signal to produce and send a detected telephone number data to the microprocessor 33. The telephone line 1 is also connected to the well-known interface circuit 2. The interface circuit 2 performs communication with the telephone line 1 in response to a communication control signal 23 from the microprocessor 33.

A hand set circuit 5 including a sending amplifier 26 and receiving amplifier 27, and a hand set 11 sends a sound signal to the telephone line 1 via the interface circuit 2 through the sending amplifier 26 and receives another sound signal from the telephone line 1 via the interface circuit 2 through the receiving amplifier 27. A dialing circuit 6 sends a dialing signal to the interface 2 in response to a dialing control signal including telephone number data from the microprocessor 33. An automatic dialing operation portion 15b produces key switch signals in response to operation of the automatic dialing key switches 14-1 to 14-9 by the user and indication of its LEDs 16-1 to 16-9 are controlled by the microprocessor 10 as mentioned above. A program switch 34 sends a mode signal indicative of normal/registration modes to the microprocessor 33. A telephone number input circuit 35 including a set of twelve keys 12 sends a telephone number data manually operated by the user successively and each of twelve keys 12 sends a key signal to the microprocessor 33. A memory 29 stores telephone number data in response to a memory control signal from the microprocessor 88. The indication switch 82 is provided for selection of effecting indication. A ring sound generation circuit 86 generates a ring sound signal in response to a control signal from the microprocessor 38. A speaker 22 produces a sound in response the ring sound signal.

Hereinbelow will be described operation of the second embodiment.

At first, the registration operation is described which is a well-known technique in the telephone apparatus with the automatic dialing function. For registration, the user turns on the program switch 34. Then, the user operates the telephone number input circuit 85 to input telephone number data to be stored in the memory 29 by successively depressing some of the twelve keys 12. When the operation of successively depressing the twelve keys 12 is finished, one of automatic dialing key switches 14-1, for example is depressed. This causes the inputted telephone number to be stored in the memory 29 at an address AD11. Similarly, other telephone numbers to be registered are stored in the memory 29 in response to each of automatic dialing key switches 14-1 to 14-9 after the input of telephone number data. Therefore, telephone number data inputted is stored in correspondence with the automatic dialing key switches 14a–14i. When the registration is finished, the user turns off the program switch 34.

The automatic dialing operation will be described. When the user picks up the hand set 11, the hook switch 9 produces and sends the off-hook signal to the microprocessor 33. When the microprocessor 33 detects the off-hook condition in response to the off-hook signal, the microprocessor 33 causes the interface circuit 2 to communicate with the telephone line 1. When the user depresses one of automatic dialing key switches 14-1 to 14-9, the microprocessor 33 reads telephone number data in response to the depressed automatic dialing key switch from memory 29 at the address corresponding to the automatic dialing key switch depressed. The microprocessor 33 sends the telephone data read out from the memory 29 to the dial signal generation circuit 39 and causes it to generate and send a dialing signal to the telephone line 1.

Figure 5:
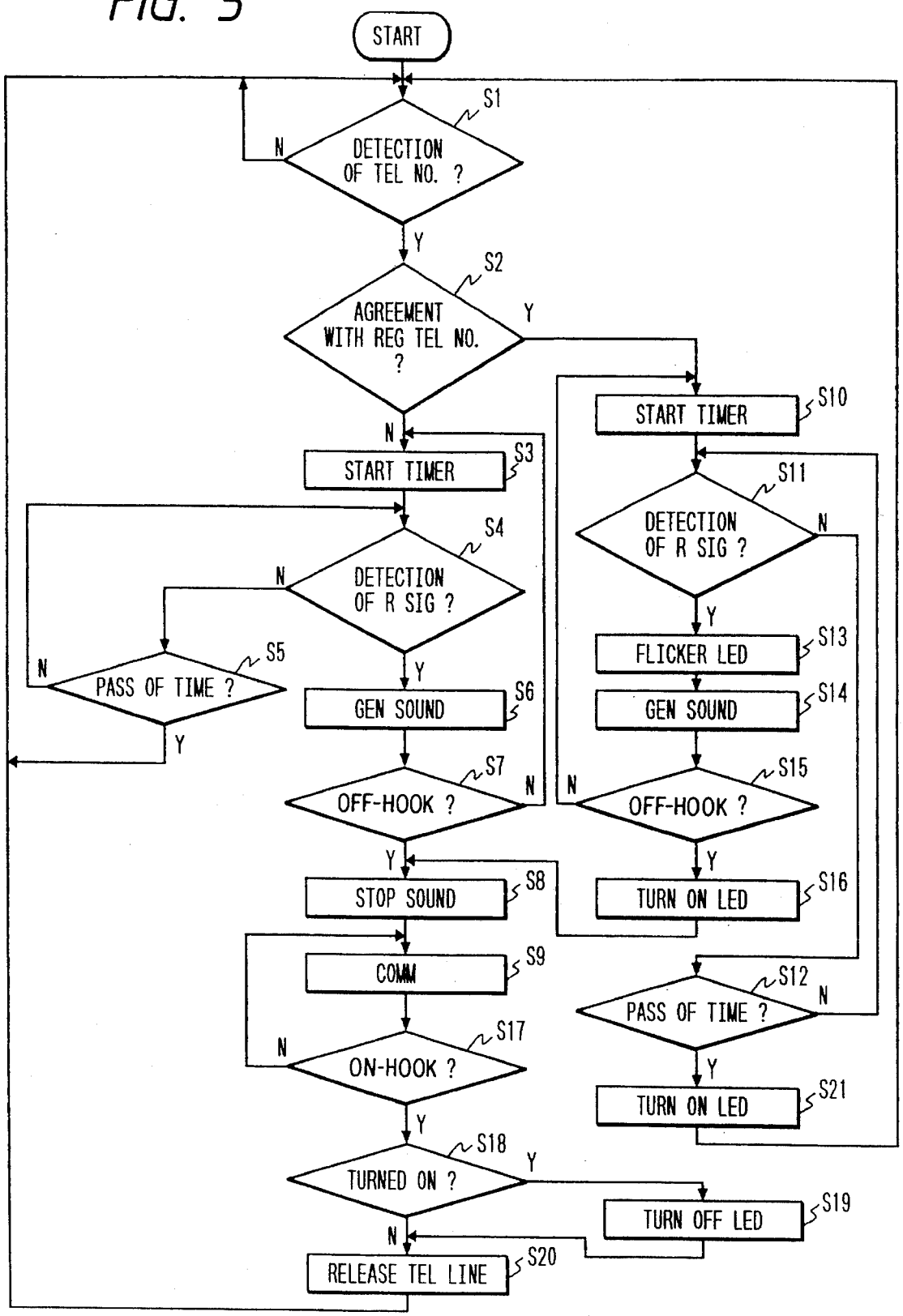
FIG. 5 shows a flow chart of the second embodiment.

Hereinbelow will be described the case of arrival of calling with reference to FIG. 5 showing a flow chart of the second embodiment.

Processing starts at a step S1 shown in FIG. 5. When a ring signal and telephone number is inputted from the telephone line 1, the ring signal detection circuit 3 detects the ring signal and sends the detected ring signal to the microprocessor 33 as well as the telephone number detection circuit 4 detects the telephone number data and the detected telephone number data to the microprocessor 33. In the step S1, the microprocessor 33 checks whether or not there is a detected telephone number data signal from the telephone number detection circuit 4. If there is no detected telephone number data, processing loops around this step until detection of the telephone number data signal. If there is the detected telephone number data, processing proceeds to a step S2. In the step S2, the microprocessor 33 compares the detected telephone number with registered telephone numbers successively. That is, the microprocessor 33 reads out the registered telephone number stored at the address ADR1 at first and compares the detected telephone number with the read telephone number. This comparison is made successively in order of the addresses ADR1 to ADR9. When there is agreement, the microprocessor 33 stores the address of the telephone number currently read out and processing proceeds to a step S10. If there is no agreement with all registered telephone numbers, processing proceeds to a step S3. In the step S3, the microprocessor 33 starts the timer 37 included therein. In the following step S4, the microprocessor 33 makes a decision as to whether the ring signal is arriving now or not. If NO, processing proceeds to a step S5. In the step S5, a decision is made as to whether a given interval has passed or not by checking an output of the timer 37. That is, the microprocessor 33 makes a decision as to whether the ring signal does not arrive over the interval between two consecutive ring signals. In the step S4, if the ring signal is inputted within the given interval measured by the timer 37, processing proceeds to a step S6. In the step S6, the microprocessor 33 causes the sound signal generation circuit 36 to generate a sound signal. Thus, the speaker 22 generates a call-up sound. In the following step S7, the microprocessor 33 makes a decision as to whether the off-hook signal indicates off-hook condition or not. If off-hook condition, that is, the user picks up the hand set 11, the microprocessor 33 causes the sound signal generation circuit 36 to stop of generation of the sound signal in the following step S8. Then, the microprocessor 33 causes the interface circuit 2 to communicate with the telephone line 1. Thus, the user can communicate with the caller by hand set 11 through a sending amplifier 26, the receiving amplifier 27, and the interface circuit 2.

In the step S2, if the answer is YES, that is the detected telephone number data agrees with either of the registered telephone numbers for auto-dialing, processing proceeds to a step S10. In the step S10, the microprocessor 33 starts the timer 37. In the following step S11, the microprocessor 33 makes a decision as to whether the ring signal is arriving now or not. If NO, processing proceeds to a step S12. In the step S12, a decision is made as to whether a given interval has passed or not by checking an output of the timer 37. That is, the microprocessor 33 makes a decision as to whether the ring signal does not arrive over the interval between two consecutive ring signals. In the step S11, if the ring signal is inputted within the given interval measured by the timer 37, processing proceeds to a step S13. In the step S13, the microprocessor 33 flickers one of LEDs in accordance with the stored address in the step S2. That is, for example, if in the step S2, agreement of the detected telephone data with registers data stored at the address ADR4, the microprocessor 33 flickers the LED 16-4. In the following step S14, the microprocessor 33 causes the sound signal generation circuit 36 to generate a sound signal. Thus, the speaker 22 generate a call-up sound. In the following step S15, the microprocessor 33 makes a decision as to whether the off-hook signal indicates off-hook condition or not. If off-hook condition, that is, the user picks up the hand set 11, processing proceeds to a step S16. In the step S16, the microprocessor 33 turns on the above-mentioned LED continuously to indicate who is calling. Then processing proceeds to the step S8. Then, the microprocessor 33 causes the interface circuit 2 to communicate with the telephone line 1. Thus, the user can communicate with the caller by hand set 11 through a sending amplifier 26, the receiving amplifier 27, and the interface circuit 2. In the following step S17 the microprocessor 33 makes a decision as to whether the off-hook signal indicates on-hook condition or not. If the off-hook signal indicates on-hook condition, processing proceeds to step S19. In the following step S18, a decision is made as to whether either of LEDs 16-1 to 16-9 is turned on. If YES, processing proceeds to a step S19. In the step S19 the microprocessor 33 turns off the LEDs 16-1 to 16-9. The step S18 can be omitted. That is, it is possible that processing proceeds to step S19 from the step S17 directly. In the following step S20, the microprocessor 33 releases the telephone line 1 and then processing returns to the step S1.

In the step S15, if the off-hook signal indicates on-hook condition, that is, the user does not pick up the hand set 11, processing returns to the step S10 until the user picks up the hand set 11 or the ring signal does not arrive over the given interval measured by the timer 37.

In the step S12, if ring signal does not arrive over the given interval, processing proceeds to a step S21. In the step S21, the microprocessor turns on the above-mentioned LED continuously to indicate for the user that a person denoted by the turned-on LED called the user during his absence. Thus, when the user comes back, the user can know who called the user and can call back using the automatic dialing key switch near the turned-on LED. For example, if Mr. D calls this telephone apparatus, the LED 16-4 turns on. The user can know who called for the user and can call back the automatic dialing key switch 14-4 adjacent to the turned on LED 16-4 with easy and quick operation.

In the embodiment mentioned above, the LED 16-4 is flickered while the ring signal is arrived and turn on the LED 16-4 continuously if nobody pick up the hand set 11. However, indication can be made reversely. That is, the indication can be made such that the LED 16-4 is turn on continuously while the ring signal is arrived and flickers the LED 16-4 continuously if nobody picks up the hand set 11. In other words, indication is made as to provide visual distinction between the interested LED and the other LEDs 16.

Moreover, in this embodiment, the LEDs 16-1 to 16-9 and key switches 14-1 to 14-9 are separately provided. However, a key switch including an LED therein can be used for each set of automatic dialing key switches 14-1 to 14-9 and LEDs 16-1 to 16-9.

Further, in the embodiment mentioned above, each of the automatic dialing key switches 14-1 to 14-9 and each of LEDs 16-1 to 16-9 are provided adjacent to each of the nameplates 13-1 to 13-9. However, automatic dialing key switches 14-1 to 14-9 may be provided separately.

In this embodiment, the one LEDs 16 is continuously turned on if the caller whose telephone number is registered for automatic dialing and nobody picks up the hand set. This operation is executed by processing of the step s21. However, this step can be omitted if this function is not required.

What is claimed is:

1. A telephone apparatus with an automatic dialing function, comprising:
   (a) storing means for storing a plurality of telephone numbers;
   (b) operational key switch means having a plurality of key switches, each key switch producing a key switch signal in response to operation of a user, said storing means storing each of said plurality of telephone numbers in relation to a corresponding one of said key switches;
   (c) a plurality of first indicating means each being provided to have a correspondence to one of said key switches and one of said telephone numbers, and each of said key switches being provided with a positional relationship to one of said first indicating means;
   (d) dialing means for dialing in response to a dialing control signal;
   (e) control means responsive to said key switch signal from each of said key switches for reading out a corresponding one of said stored plurality of telephone numbers and producing said dialing control signal in accordance with said read out telephone number;
   (f) telephone number detection means for detecting a telephone number data indicative of a telephone number of a caller sent from a telephone line;
   (g) comparing means for comparing said detected telephone number data with said stored plurality of telephone numbers to produce an indication control signal when said detected telephone number data matches one of said plurality of stored telephone numbers; and
   (h) second indication means, provided in relation to said operational key switch means, responsive to said indication control signal for making an indication, said indication control signal being produced by said comparing means such that one of said plurality of first indicating means is indicated by said second indication means in accordance with said matched telephone numbers to inform said user that said detected telephone number data corresponds to one of said plurality of key switches which in turn corresponds to one of said plurality of stored telephone numbers.

2. A telephone apparatus as claimed in claim 1, further comprising:
   off-hook detection means for detecting an off-hook condition of said telephone apparatus, said indication means having first and second indication conditions; and
   second control means responsive to said off-hook detection means and said comparing means for causing said indication means to change said first condition to said second condition when said detected telephone number agrees with said stored telephone number.

3. A telephone apparatus as claimed in claim 1, further comprising off-hook detection means for detecting off-hook and on-hook conditions of said telephone apparatus and second control means responsive to said off-hook detection means and said comparing means for stopping said indication when said off-hook detection means detects said off-hook condition and then said on-hook condition when said detected telephone number agrees with said stored telephone number.

4. A telephone apparatus as claimed in claim 1, further comprising:
   (a) off-hook detection means for detecting an off-hook condition of said telephone apparatus;
   (b) detection means responsive to said off-hook detection means and said comparing means for detecting a failure of off-hook condition within a predetermined interval from when said detected telephone number agrees with said stored telephone number, said indication means having first and second indication conditions; and
   (c) second control means responsive to said detection means for changing said first indication condition to said second indication condition.

5. A telephone apparatus as claimed in claim 1, wherein each of said key switches is provided adjacent to a corresponding one of said first indicating means.

6. A telephone apparatus with an automatic dialing function, comprising:
   (a) N operational key switches for producing corresponding N key switch signals in response to operation of a user, said N being a whole number;
   (b) storing means for storing N telephone numbers such that each of said N telephone numbers corresponds to one of said N operational key switches;
   (c) N first indicating means each being provided to have a correspondence to one of said N operational key switches and to one or said N telephone numbers, each of said N operational key switches being provided with a positional relationship with one of said N first indicating means;
   (d) dialing means for dialing in response to a dialing control signal;
   (e) control means responsive to one of said N key switch signals for reading out one of said N stored telephone numbers which corresponds to one of said N operational key switches operated by said user, and for producing said dialing control signal in accordance with said read out telephone number;
   (f) telephone number detection means for detecting a telephone number data indicative of a telephone number of a caller sent from a telephone line;
   (g) comparing means for comparing said detected telephone number data with said N stored telephone numbers successively to produce an indication control signal when said detected telephone number agrees with one of said stored N telephone numbers; and
   (h) second indication means, having N indication elements, each of said N indication elements corresponding to one of said N operational key switches, said second indication means responsive to said indication control signal for making an indication with one of said N indication elements which corresponds to one of said N operational key switches which in turn corresponds to said detected telephone number data.

7. A telephone apparatus as claimed in claim 6, further comprising:
   off-hook detection means for detecting an off-hook condition of said telephone apparatus, each of said N indication means having first and second indication conditions; and
   second control means responsive to said off-hook detection means and said comparing means for causing said indication means to change said first condition to said second condition when said detected telephone number agrees with one of said stored telephone numbers.

8. A telephone apparatus as claimed in claim 6, further comprising off-hook detection means for detecting off-hook and on-hook conditions of said telephone apparatus and second control means responsive to said off-hook detection means and said comparing means for stopping said indication by said one of said N indication means when said off-hook detection means detects said off-hook condition and then said on-hook condition when said detected telephone number agrees with one of said N stored telephone number.

9. A telephone apparatus as claimed in claim 6, further comprising:

(a) off-hook detection means for detecting an off-hook condition of said telephone apparatus;

(b) detection means responsive to said off-hook detection means and said comparing means for detecting a failure of off-hook condition within a predetermined interval from when said detected telephone number agrees with said one of said stored telephone numbers, each of said N indication means having first and second indication conditions; and (c) second control means responsive to said detection means for changing said first indication condition to said second indication condition by said one of said N indication elements.

10. A telephone apparatus as claimed in claim 6, wherein each of said N operational key switches is provided adjacent to one of said N first indicating means.

11. A telephone apparatus with an automatic dialing function, comprising:

(a) N operational key switches for producing corresponding N key switch signals in response to operation of a user, said N being a whole number;

(b) storing means for storing N telephone numbers such that each of said N telephone numbers corresponds to one of said N operational key switches;

(c) N first indicating means each being provided to have a correspondence to one of said N operational key switches and to one of said N telephone numbers;

(d) dialing means for dialing in response to a dialing control signal;

(e) first control means responsive to one of said N key switch signals for reading out one of said N stored telephone numbers which corresponds to one of said N operational key switches and for producing said dialing control signal in accordance with said read out telephone number;

(f) telephone number detection means for detecting a telephone number data indicative of a telephone number of a caller sent from a telephone line;

(g) second control means for comparing said detected telephone number data with said N stored telephone numbers successively and for producing an indication control signal to indicate which one of said N operational key switches corresponds to said detected telephone number when said detected telephone number matches one of said stored N telephone numbers; and (h) N second indication means each having an identification mark corresponding to one of said N operational key switches and responsive to said indication control signal for indicating to said user which one of said N operational key switches corresponds to said detected telephone number.

12. A telephone apparatus with an automatic dialing function, comprising:

(a) an automatic dialing portion having N operational key switches and N indicators, said N operational key switches responsive to operation of a user for producing N key switch signals respectively, said N indicators being provided such that each of said N operational key switches corresponds to one of said N indicators, and each of said N operational key switches being provided with a positional relationship with one of said N indicators, said N being a whole number;

(b) storing means for storing N telephone numbers such that each of said N telephone numbers corresponds to one of said N operational key switches;

(c) dialing means for dialing in response to a dialing control signal;

(d) first control means responsive to one of said N key switch signals for reading out one of said N stored telephone numbers which corresponds to one of said N key switches operated by said user and for producing said dialing control signal in accordance with said read out telephone number;

(e) telephone number detection means for detecting telephone number data indicative of a telephone number of a caller sent from a telephone line; and (f) second control means for comparing said detected telephone number data with said N stored telephone numbers, successively, for detecting which operational key switch of said N operational key switches corresponds to said detected telephone number when said one of said N stored telephone numbers matches said detected telephone number; and for producing an indication control signal to cause one of said N indicators which corresponds to said detected one of said N operational key switches to effect indication to inform said user that a call by said caller corresponds to said detected one of said operational keys when said one of said N stored telephone numbers matches said detected telephone number.

13. A telephone apparatus with an automatic dialing function as claimed in claim 12, wherein said automatic dialing portion further comprises N nameplates provided such that each of said N nameplates corresponds to each of said N indicators.

14. A telephone apparatus as claimed in claim 12, further comprising:

off-hook detection means for detecting an off-hook condition of said telephone apparatus, each of said N indicators having first and second indication conditions; and second control means responsive to said off-hook detection means and said comparing means for causing said one of N indicators to change said first condition to said second condition when said detected telephone number agrees with one of said stored telephone numbers.

15. A telephone apparatus as claimed in claim 12, further comprising off-hook detection means for detecting off-hook and on-hook conditions of said telephone apparatus and second control means responsive to said off-hook detection means and said comparing means for stopping said indication by said one of said N indicators when said off-hook detection means detects said off-hook condition and then said off-hook detection means detects said on-hook condition when said detected telephone number agrees with one of said N stored telephone numbers.

16. A telephone apparatus as claimed in claim 12, further comprising:

(a) off-hook detection means for detecting an off-hook condition of said telephone apparatus;

(b) detection means responsive to said off-hook detection means and said comparing means for detecting a failure of off-hook condition within a predetermined interval from when said detected telephone number agrees with said one of said N stored telephone numbers, each of said N indicators having first and second indication conditions; and (c) second control means responsive to said detection means for changing said first indication condition of said one of said N indicators to said second indication condition.

17. A telephone apparatus as claimed in claim 12, wherein said each of said N operational key switches is provided adjacent to said each of said N indicators.

18. A telephone apparatus with an automatic dialing function, comprising:

(a) an automatic dialing portion having N operational key switches and N indicators, said N operational key switches responsive to operation of a user for producing N key switch signals respectively, said N indicators being provided such that each of said N operational key switches corresponds to one of said N indicators, each of said key switches being provided with a positional relationship with one of said N indicators, said N being a whole number;

(b) storing means for storing N telephone numbers such that each of said N telephone numbers corresponds to one of said N operational key switches;

(c) dialing means for dialing in response to a dialing control signal;

(d) first control means responsive to one of said N key switch signals for reading out one of said N stored telephone numbers which corresponds to one of said N key switches operated by said user and for producing said dialing control signal in accordance with said read out telephone number;

(e) ring signal detection means for detecting a ring signal to produce a detected ring signal;

(f) telephone number detection means tier detecting a telephone number data indicative of a telephone number of a caller sent from a telephone line;

(g) second control means for comparing said detected telephone number data with said N stored telephone numbers successively and for detecting which operational key switch of said N operational key switches corresponds to said detected telephone number when said one of said N stored telephone numbers agrees with said detected telephone number data;

(h) detection means responsive to said detected ring signal ,and said second control means for detecting the absence of said detected ring signal for a given interval when said one of said N stored telephone numbers agrees with said detected telephone number; and (i) third control means for producing an indication control signal to cause said N indicator which corresponds to said detected N operational key switch to effect indication in response to said detection means to inform said user that there has been a call corresponding to said detected operational key switch when said one of said N stored telephone numbers matches said detected telephone number.

19. A telephone apparatus as claimed in claim 18, wherein said each of said N operational key switches is provided adjacent to said each of said N indicators.

* * * * *